(12) United States Patent
Tseng et al.

(10) Patent No.: US 8,462,113 B2
(45) Date of Patent: Jun. 11, 2013

(54) METHOD FOR EXECUTING MOUSE FUNCTION OF ELECTRONIC DEVICE AND ELECTRONIC DEVICE THEREOF

(75) Inventors: Wen-Chieh Tseng, Taipei (TW); Tzu-Wei Tai, Taipei (TW); Yi-Hsuan Cheng, Taipei (TW); Chia-Hsin Wu, Taipei (TW); Chao-Chia Liao, Taipei (TW); Shih-Ying Chen, Taipei (TW); Hsin-Wen Tsai, Taipei (TW); Sheng-Ta Lin, Taipei (TW); Wei-Yin Su, Taipei (TW); Chia-Chang Tsui, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 686 days.

(21) Appl. No.: 12/422,302

(22) Filed: Apr. 13, 2009

(65) Prior Publication Data

US 2009/0295720 A1 Dec. 3, 2009

(30) Foreign Application Priority Data

Jun. 2, 2008 (TW) ................................. 97120454 A

(51) Int. Cl.
*G09G 5/08* (2006.01)

(52) U.S. Cl.
USPC .......................................... 345/163; 345/173

(58) Field of Classification Search
None
See application file for complete search history.

(56) References Cited

U.S. PATENT DOCUMENTS

| | | | |
|---|---|---|---|
| 5,825,352 A | 10/1998 | Bisset et al. | |
| 5,982,302 A * | 11/1999 | Ure | 341/22 |
| 7,030,861 B1 | 4/2006 | Westerman et al. | |
| 2003/0132913 A1 | 7/2003 | Issinski | |
| 2006/0125803 A1 | 6/2006 | Westerman et al. | |
| 2007/0177803 A1 | 8/2007 | Elias et al. | |
| 2007/0257890 A1 | 11/2007 | Hotelling et al. | |
| 2007/0268273 A1 | 11/2007 | Westerman et al. | |

FOREIGN PATENT DOCUMENTS

| | | |
|---|---|---|
| CN | 1477478 | 2/2004 |
| CN | 1499343 | 5/2004 |
| CN | 1673940 | 9/2005 |
| CN | 1912816 | 2/2007 |
| TW | I248028 | 1/2006 |
| TW | I295441 | 4/2008 |
| TW | I295785 | 4/2008 |

OTHER PUBLICATIONS

Article titled "Mouse Emulation" obtained from Finger Works of http://www.fingerworks.com/gesture_guide_mouse.html generated Aug. 30, 2005.
"First Office Action of China Counterpart Application," issued on Sep. 9, 2010, p. 1-p. 10, in which the listed references were cited.

* cited by examiner

*Primary Examiner* — Joseph Haley
(74) *Attorney, Agent, or Firm* — Jianq Chyun IP Office

(57) ABSTRACT

A method for executing a mouse function of electronic device and an electronic device thereof are provided. In the present method, an amount and a relative position of input signals are detected by a sensor module. Then, whether the amount and the relative position are respectively conformed to a predetermined value is determined. If the predetermined values are conformed, whether the input signal is conformed to a specific signal is determined when a variation of the relative position is occurred. Finally, a corresponding mouse function is executed according to a type of the variation if the variation is conformed to the specific signal. As a result, a mouse device is no longer needed for a user to accomplish a directional operation on the electronic device so as to prevent inconvenience of particularly carrying a mouse device.

14 Claims, 3 Drawing Sheets

METHOD FOR EXECUTING MOUSE FUNCTION OF ELECTRONIC DEVICE AND ELECTRONIC DEVICE THEREOF

CROSS-REFERENCE TO RELATED APPLICATION

This application claims the priority benefit of Taiwan application serial no. 97120454, filed on Jun. 2, 2008. The entirety of the above-mentioned patent application is hereby incorporated by reference herein and made a part of specification.

BACKGROUND OF THE INVENTION

1. Field of the Invention

The present invention relates to a method for operating an electronic device. More particularly, the present invention relates to a method for executing a mouse function of an electronic device and the electronic device thereof.

2. Description of Related Art

With development of computer technology, popularisation of computer systems is increasingly improved, and the computer system becomes one of indispensable tools in people's daily life. By executing various application programs, the computer system can not only swiftly process documents, but can also accomplish functions such as playing multimedia files, browsing websites, and storing data, etc. Generally, when a user operates the computer system, a mouse is applied to perform directional operations, so as to open files or execute functions.

However, taking a commonly used mouse as an example, though the mouse in accord with human engineering is easy to be operated, a size thereof is relatively great and is inconvenient to be carried around. For most of the laptop users accustomed to carrying an additional mouse, it may cause considerable inconvenience. If the user selects a mouse that is easy to be carried, it may have a disadvantage of utilization inconvenience due to a relatively small size of the mouse. To resolve such a problem, a touch pad is applied to the laptop for substituting the mouse.

Comparatively, most of the users accustomed to using the mouse cannot quickly and proficiently control the mouse cursor or select a file via the touch panel, so that original operating habits have to be changed for operating the touch panel, which may cause a considerable inconvenience for the user.

SUMMARY OF THE INVENTION

Accordingly, the present invention is directed to a method for executing a mouse function of an electronic device, by which various mouse functions can be activated by directly detecting a hand action of a user, so as to avoid inconvenience caused by carrying a mouse.

The present invention is directed to an electronic device having a mouse executing function, by which a user can operate the electronic device more comfortably by operating a virtual mouse.

The present invention provides a method for executing a mouse function of an electronic device, wherein the electronic device includes a sensor module. In the present method, an amount and relative position of a plurality of input signals are first detected by the sensor module. Next, whether the amount and the relative position respectively conform to a predetermined value is determined. If the predetermined values are conformed, and when the relative position of the input signals is varied, whether the variation is conformed to a specific signal is determined. Finally, a corresponding mouse function is executed according to a type of the variation if the variation conforms to the specific signal.

In an embodiment of the present invention, the sensor module is a touch input unit, and the input signal is a touch signal.

In an embodiment of the present invention, after the amount is judged to be conformed to the predetermined value, the variation represents that the touch signal is disappeared or a position thereof is shifted.

In an embodiment of the present invention, if the predetermined values are conformed, and when the relative position of the input signals is varied, the step of determining whether the variation is conformed to the specific signal includes judging the varied touch signal is conformed to a first specific signal if counting from a specific direction, the varied touch signal is an i-th touch signal of all of the touch signals; and judging the varied touch signal is conformed to a second specific signal if counting from the specific direction, the varied touch signal is a j-th touch signal of all of the touch signals, wherein i and j are positive integers less than or equal to the predetermined value, and i is not equal to j.

In an embodiment of the present invention, if the variation is conformed to the specific signal, the step of executing the corresponding mouse function according to the type of the variation includes obtaining an amount of the touch signal detected by the touch input unit during a first time period when the varied touch signal is conformed to the first specific signal; executing a function of single-clicking a left button of a mouse if the amount is 1; and executing a function of double-clicking the left button of the mouse if the amount is 2.

In an embodiment of the present invention, if the variation is conformed to the specific signal, the step of executing the corresponding mouse function according to the type of the variation includes obtaining a motion track of the touch signal if a time for the touch input unit continually detecting the touch signal exceeds a second time period, and when the varied touch signal is conformed to the first specific signal, and executing a mouse wheel function according to a direction of the motion track, wherein the second time period is greater than the first time period.

In an embodiment of the present invention, if the variation is conformed to the specific signal, the step of executing the corresponding mouse function according to the type of the variation includes obtaining an amount of the touch signal detected by the touch input unit during the first time period when the varied touch signal is conformed to the second specific signal, and executing a function of single-clicking a right button of the mouse if the amount is 1.

In an embodiment of the present invention, if the variation is conformed to the specific signal, the step of executing the corresponding mouse function according to the type of the variation includes obtaining an amount of the varied touch signal detected by the touch input unit during the first time period when the varied touch signal is simultaneously conformed to the first specific signal and the second specific signal, and executing a function of single-clicking a middle button of the mouse if the amount is 1.

In an embodiment of the present invention, after the amount is judged to be conformed to the predetermined value, the method further includes obtaining the motion track of the touch signal if a time for the touch input unit continually detecting all of the touch signals exceeds a third time period, and when all of the touch signals are simultaneously varied, and correspondingly moving a mouse cursor according to the motion track.

In an embodiment of the present invention, the touch input unit includes a touch pad or a touch screen.

In an embodiment of the present invention, the sensor module includes an image capturing unit and a sensing unit. The image capturing unit is used for capturing an image of a hand, wherein the hand includes at least a finger. The input signals are motion variation signals of the finger that are detected by the sensing unit, and the specific signal is a motion variation signal of a specific finger.

In an embodiment of the present invention, the step of capturing the image of the hand includes defining a specific region where the hand is located according to the image of the hand, and judging whether the hand has a specific pose in the specific region for generating the motion variation signal.

In an embodiment of the present invention, the specific pose includes a vertical movement or a horizontal movement of the finger.

In an embodiment of the present invention, if the predetermined values are conformed, and when the relative position of the input signals is varied, the step of determining whether the variation is conformed to the specific signal includes judging the finger having the motion variation is conformed to a first specific finger if counting from a specific direction, the finger having the motion variation is an i-th finger of all of the fingers; and judging the finger having the motion variation is conformed to a second finger if counting from the specific direction, the finger having the motion variation is a j-th finger of all of the fingers. Wherein, i and j are positive integers less than or equal to the predetermined value, and i is not equal to j.

In an embodiment of the present invention, if the variation is conformed to the specific signal, the step of executing the corresponding mouse function according to the type of the variation includes obtaining an amount of vertical movements of the finger during a first time period when the finger having the motion variation is conformed to the first specific finger; executing a function of single-clicking the left button of the mouse if the amount is 1; and executing a function of double-clicking the left button of the mouse if the amount is 2.

In an embodiment of the present invention, if the variation is conformed to the specific signal, the step of executing the corresponding mouse function according to the type of the variation includes obtaining a motion track of the finger if the finger is judged to be horizontally moved after a second time period, and when the finger having the motion variation is conformed to the first specific finger, and executing a mouse wheel function according to a direction of the motion track, wherein the second time period is greater than the first time period.

In an embodiment of the present invention, if the variation is conformed to the specific signal, the step of executing the corresponding mouse function according to the type of the variation includes obtaining an amount of vertical movements of the finger during the first time period when the finger having the motion variation is conformed to the second specific finger, and executing a function of single-clicking the right button of the mouse if the amount is 1.

In an embodiment of the present invention, if the variation is conformed to the specific signal, the step of executing the corresponding mouse function according to the type of the variation includes obtaining an amount of vertical movements of the finger during the first time period when the finger having the motion variation is the first specific finger and the second specific finger, and executing a function of single-clicking the middle button of the mouse if the amount is 1.

In an embodiment of the present invention, after the step of judging whether the hand located at the specific region has the specific pose for generating the motion variation signal, the method further includes obtaining a motion track of the finger if all of the fingers are horizontally moved after a third time period, and moving a mouse cursor according to the motion track.

In an embodiment of the present invention, the image is captured by the image capturing unit, and the sensing unit includes an infrared projection device.

The present invention provides an electronic device having a mouse executing function, suitable for executing a plurality of mouse functions according to motion variations of a hand. The electronic device includes a display, a sensor module and a judging module. The display has a screen capable of displaying a mouse cursor. The sensor module is coupled to the display for detecting an amount and a relative position of input signals. The judging module is simultaneously coupled to the display and the sensor module for judging whether the amount and the relative position are respectively conformed to a predetermined value. If the predetermined values are conformed, and when the relative position of the input signals is varied, whether the variation is conformed to a specific signal is determined. A corresponding mouse function is executed according to a type of the variation if the variation is conformed to the specific signal.

In an embodiment of the present invention, the sensor module is a touch input unit, and the input signal is a touch signal. The variation represents that the touch signal is disappeared or a position thereof is shifted.

In an embodiment of the present invention, the judging module judges that the varied touch signal is conformed to a first specific signal if counting from a specific direction, the varied touch signal is an i-th touch signal of the touch signals; and judges the varied touch signal is conformed to a second specific signal if counting from the specific direction, the varied touch signal is a j-th touch signal of the touch signals. Wherein, i and j are positive integers less than or equal to the predetermined value, and i is not equal to j.

In an embodiment of the present invention, the judging module obtains an amount of the touch signal detected by the touch input unit during a first time period when the varied touch signal is conformed to the first specific signal, and executes a function of single-clicking a left button of the mouse if the amount is 1, or executes a function of double-clicking the left button of the mouse if the amount is 2.

In an embodiment of the present invention, wherein when the varied touch signal is conformed to the first specific signal, and if a time for the touch input unit continually detecting the touch signal exceeds a second time period, the judging module obtains a motion track of the touch signal, and executes a mouse wheel function according to a direction of the motion track, wherein the second time period is greater than the first time period.

In an embodiment of the present invention, the judging module obtains an amount of the touch signal detected by the touch input unit during the first time period when the varied touch signal is conformed to the second specific signal, and executes a function of single-clicking a right button of the mouse if the amount is 1.

In an embodiment of the present invention, the judging module obtains an amount of the varied touch signal detected by the touch input unit during the first time period when the varied touch signal is simultaneously conformed to the first specific signal and the second specific signal, and executes a function of single-clicking a middle button of the mouse if the amount is 1.

In an embodiment of the present invention, when the judging module judges the touch signals are simultaneously varied, and if a time for the touch input unit continually detecting the touch signals exceeds a third time period, the judging module obtains a motion track of the touch signal, and correspondingly moves a mouse cursor according to the motion track.

In an embodiment of the present invention, the touch input unit includes a touch pad or a touch screen.

In an embodiment of the present invention, the sensor module includes an image capturing unit and a sensing unit. The image capturing unit is used for capturing an image of a hand, wherein the hand includes at least a finger. The input signals are motion variation signals of the finger that are detected by the sensing unit, and the specific signal is a motion variation signal of a specific finger.

In an embodiment of the present invention, the sensing unit defines a specific region where the hand is located according to the image of the hand. The judging module judges whether the hand has a specific pose in the specific region for generating the motion variation signal.

In an embodiment of the present invention, the specific pose includes a vertical movement or a horizontal movement of the finger.

In an embodiment of the present invention, the judging module judges the finger having the motion variation is conformed to a first specific finger if counting from a specific direction, the finger having the motion variation is an i-th finger of the fingers; and judges the finger having the motion variation is conformed to a second finger if counting from the specific direction, the finger having the motion variation is a j-th touch signal of the fingers. Wherein, i and j are positive integers less than or equal to a predetermined value, and i is not equal to j.

In an embodiment of the present invention, the judging module obtains an amount of vertical movements of the finger during a first time period when the finger having the motion variation is conformed to the first specific finger, and executes a function of single-clicking the left button of the mouse if the amount is 1, and executes a function of double-clicking the left button of the mouse if the amount is 2.

In an embodiment of the present invention, the judging module obtains a motion track of the finger if the finger is judged to be horizontally moved after a second time period, and when the finger having the motion variation is conformed to the first specific finger, and executes a mouse wheel function according to a direction of the motion track, wherein the second time period is greater than the first time period.

In an embodiment of the present invention, the judging module obtains an amount of vertical movements of the finger during the first time period when the finger having the motion variation is conformed to the second specific finger, and executes a function of single-clicking the right button of the mouse if the amount is 1.

In an embodiment of the present invention, the judging module obtains an amount of vertical movements of the finger having the motion variation during the first time period when the finger having the motion variation is the first specific finger and the second specific finger, and executes a function of single-clicking the middle button of the mouse if the amount is 1.

In an embodiment of the present invention, the judging module obtains a motion track of the finger if all of the fingers are horizontally moved after the third time period, simultaneously, and moves the mouse cursor according to the motion track.

In an embodiment of the present invention, the sensing unit includes an infrared projection device.

In the present invention, motion variations of a user's hand is directly detected, so as to correspondingly execute various mouse functions on the electronic device. Therefore, clicking of mouse buttons and dragging of the mouse cursor can be accomplished without utilizing an actual mouse. Accordingly, inconvenience of carrying an additional mouse can be avoided.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

To fully convey the spirit of the present invention, embodiments are provided below for describing the present invention in detail.

Figure 1:
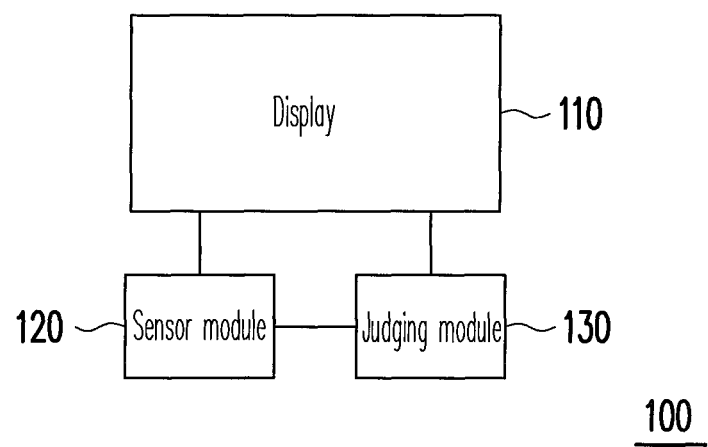
FIG. 1 is a block diagram illustrating an electronic device having a mouse executing function according to an embodiment of the present invention.

FIG. 1 is a block diagram illustrating an electronic device having a mouse executing function according to an embodiment of the present invention. Referring to FIG. 1, the electronic device 100 includes a display 110, a sensor module 120 and a judging module 130. The electronic device 100 can be a computer system such as a desktop computer or a laptop computer, etc., which is not limited by the present invention.

In the electronic device 100, the display 110 has a screen for displaying a mouse cursor. The sensor module 120 is coupled to the display 110 for detecting an amount of and a relative position of input signals. The judging module 130 is coupled to the display 110 and the sensor module 120 for judging whether the amount and the relative position are respectively conformed to a predetermined value. If the predetermined values are conformed, and when the relative position of the input signals is varied, whether the variation is conformed to a specific signal is determined. If the variation is conformed to the specific signal, a corresponding mouse function is executed according to a type of the variation.

During operations of the display 110, the sensor module 120 and the judging module 130, when the sensor module 120 detects that the amount of the input signal is conformed to the predetermined value, and the judging module 130 judges that the variation of the relative position of the input signals is conformed to the specific signal, the judging module 130 then executes the corresponding mouse function according to the type of the variation.

Figure 2:
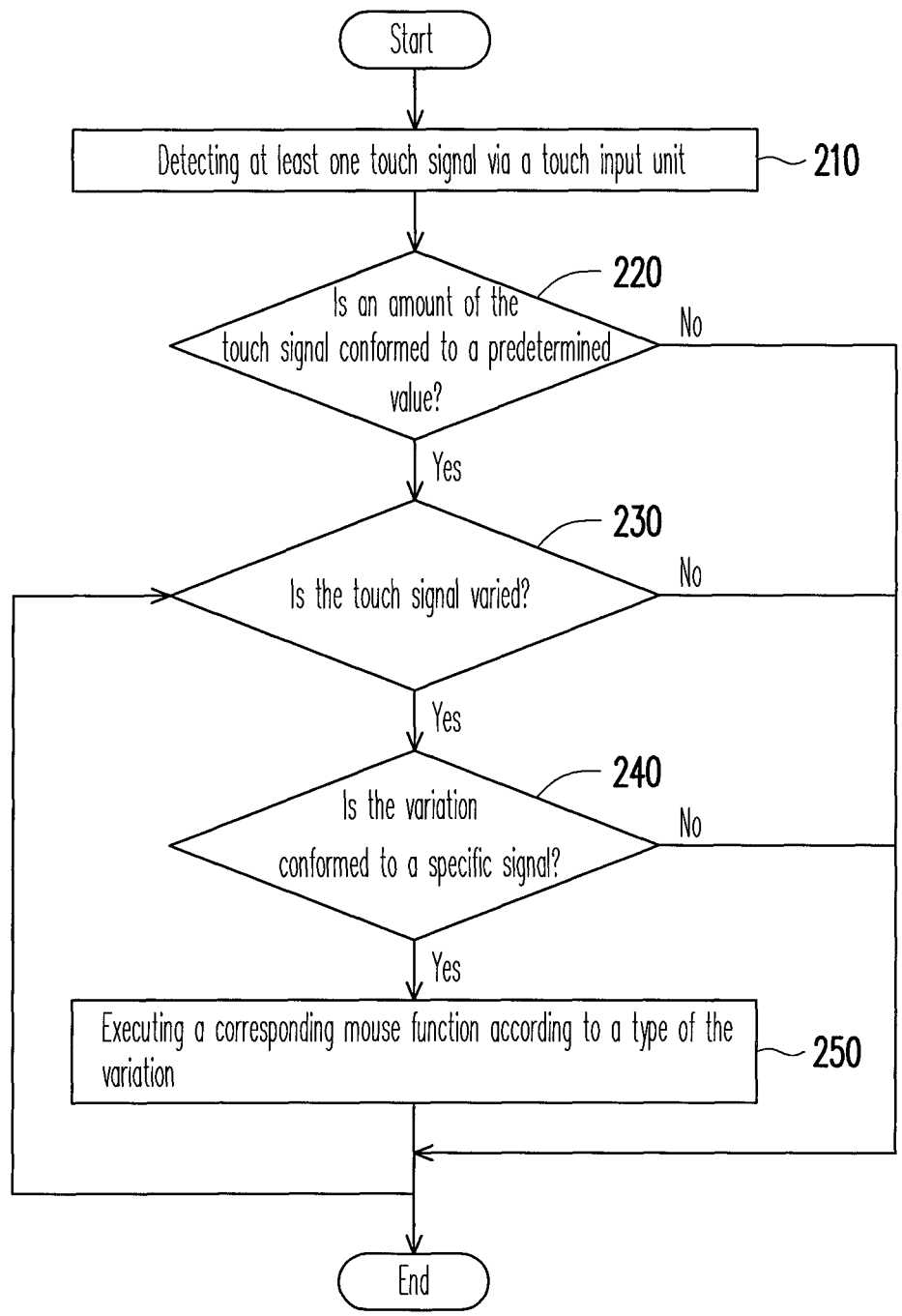
FIG. 2 is a flowchart illustrating a method for executing a mouse function of an electronic device according to an embodiment of the present invention.

However, a different sensor module 120 can detect different type of the input signals. FIG. 2 is a flowchart illustrating a method for executing a mouse function of an electronic device according to an embodiment of the present invention. Referring to FIG. 1 and FIG. 2, in the present embodiment, the sensor module 120 is a touch input unit, and accordingly the input signal is a touch signal. In the following content, how to detect hand actions of a user via the touch input unit, so as to execute various mouse functions on the electronic device 100 is described in detail.

First, in step 210, at least one touch signal is detected via the touch input unit (i.e. the sensor module 120). Wherein, the touch input unit can be a touch pad or a touch screen, etc., which is used for detecting the touch signals generated when the user touches the touch input unit by the hand. In the present embodiment, since the touch input unit can support a multi-point touch technology, more than one touch signals can be simultaneously detected.

Wherein, in the present embodiment, the touch input unit can detect a predetermined amount of the touch signals for activating the mouse functions. Besides, the user can continually perform actions on the touch input unit to maintain the touch signal existing a predetermined time, so as to activate the mouse functions. For example, the user can continually perform actions on the touch input unit by 5 fingers for a predetermined time, so as to activate the mouse functions. How to activate the mouse functions is not limited by the present invention.

After at least one touch signal is detected by the touch input unit (step 210), in step 220, the judging module 130 judges whether the amount of the touch signal is conformed to the predetermined value. For simplicity's sake, in the following embodiments, the predetermined values are all assumed to be 5, though such value is not used for limiting the present invention. In the step 220 of the present embodiment, whether an amount of touch points between the hand of the user and the touch input unit is 5 is judged. If the amount of the touch points between the hand of the user and the touch input unit is 5, 5 touch signals are then detected by the touch input unit, and the amount of the touch signal is then conformed to the predetermined value.

After the amount of the touch signal is judged to be conformed to the predetermined value (the step 220), in step 230, the judging module 130 judges whether there is any variation of the relative position of the touch signals. In detail, once a certain touch signal is disappeared or a position thereof is varied, such touch signal is then judged to be varied. In all of the touch signals detected by the touch input unit, as long as one or more touch signals is varied, a step 240 is executed, by which the judging module 130 judges whether the variation is conformed to the specific signal.

In the following content, the step for the judging module 130 judging whether the variation is conformed to the specific signal are described. In the present embodiment, if counting from a specific direction, the varied touch signal is an i-th touch signal of all of the touch signals, the varied touch signal is judged to be conformed to a first specific signal. If counting from the specific direction, the varied touch signal is a j-th touch signal of all of the touch signals, the varied touch signal is judged to be conformed to a second specific signal. Wherein, i and j are positive integers less than or equal to a predetermined value, and i is not equal to j.

For example, in the present embodiment, i and j are respectively 2 and 3, and the touch input unit detects 5 touch signals. Therefore, when the user touches the touch input unit by 5 fingers, the touch input unit can automatically number the 5 touch signals according to a relative position of the touch signals. In detail, the touch signals are numbered as 1st, 2nd, 3rd, 4th, 5th touch signals according to a specific direction (for example from the left to the right). After the touch input unit numbers the touch signals, the judging module 130 judges whether the 1st, 2nd, 3rd, 4th, 5th touch signals are varied according to the numbers of the touch signals continually detected by the touch input unit. The above variation represents that for example, any of the touch signals is disappeared or a position thereof is shifted.

As described above, assuming the varied touch signal is the 2nd touch signal, the touch signal is then conformed to the first specific signal. However, if the varied touch signal is the 3rd touch signal, the touch signal is then conformed to the second specific signal.

When the varied touch signal is conformed to the specific signal, in step 250, the judging module 130 executes a corresponding mouse function according to a type of the variation. In an embodiment, if the varied touch signal is conformed to the first specific signal (i.e. the varied touch signal is the 2nd touch signal counted from the left to the right), the judging module 130 obtains an amount of such touch signal detected by the touch input unit during a first time period. If the amount is 1, the judging module 130 executes a function of single-clicking a left button of the mouse on the electronic device 100; and if the amount is 2, the judging module 130 executes a function of double-clicking the left button of the mouse. In view of a using angle of the user, after the user touches the touch input unit by 5 fingers of his right hand, if a forefinger (which can generate the 2nd touch signal counted from the left to the right) withdraws from the touch input unit and touches the touch input unit again during the first time period, the function of single-clicking the left button of the mouse is then executed on the electronic device 100. If the user repeats an action of withdrawing the forefinger from the touch input unit and touching the forefinger on the touch input unit twice during the first time period, since the touch input unit can detects two touch signals, the function of double-clicking the left button of the mouse is then executed.

Accordingly, when the varied touch signal is conformed to the first specific signal, and if a time for the touch input unit continually detecting such touch signal exceeds the second time period (the second time period is greater than the first time period), the judging module 130 obtains a motion track of the touch signal via the touch input unit, and executes a mouse wheel function according to a direction of the motion track. Namely, if a time for the forefinger touching the touch input unit reaches the second time period, when the user slides the forefinger back and forth on the touch input unit, the mouse wheel function is executed on the electronic device 100.

In another embodiment, if the varied touch signal is conformed to the second specific signal (i.e. the varied touch signal is the 3rd touch signal counted from the left to the right), the judging module 130 obtains an amount of such touch signal detected by the touch input unit during the first time period, wherein if the amount is 1, a function of single-clicking a right button of the mouse is then executed on the electronic device 100. Moreover, if the varied touch signal is simultaneously conformed to the first specific signal and the second specific signal, the judging module 130 then obtains an amount of the varied touch signal detected by the touch input unit during the first time period, and executes a function of single-clicking a middle button of the mouse when the amount is 1. Further, after the user touches the touch input unit by 5 fingers of his right hand, if the forefinger (which can generate the 3rd touch signal counted from the left to the right) withdraws from the touch input unit and touches the touch input unit again during the first time period, the function of single-clicking the right button of the mouse is then executed on the electronic device 100. If the user simultaneously withdraws the forefinger and a middle finger from the touch input unit and touches the forefinger and the middle finger on the touch input unit again during the first time period, since now the varied touch signal is simultaneously conformed to the first specific signal and the second specific signal, the function of single-clicking the middle button of the mouse is then executed.

In another embodiment, after the judging module 130 judges that the amount of the touch signal is conformed to the predetermined value, if all of the touch signals are simultaneously varied, and a time for the touch input unit continually detecting the touch signals exceeds a third time period, the judging module 130 obtains the motion track of the touch signal, and correspondingly moves a mouse cursor according to the motion track. In other words, after a time for the 5 fingers touching the touch input unit reaches the third time period, the user can simultaneously move the 5 fingers for correspondingly changing a position of the mouse cursor on the display 110.

After the corresponding mouse function is executed according to the type of the variation, the step 230 is repeated, by which the judging module 130 continuously judges whether there is any variation of the relative position of the touch signal. If there is any variation, the step 240 is executed for judging whether the variation is conformed to the specific signal, and in the step 250, a corresponding mouse function is executed. Otherwise, the flowchart of the method for executing the mouse function of the electronic device is ended.

It should be noted that as long as any of the varied touch signals is not conformed to the aforementioned defined specific signal, the electronic device 100 then does not react to hand actions of the user. Namely, in this case, none mouse function is activated.

In the present embodiment, the right hand forefinger of the user is defined as the left button of the mouse, and the middle finger is defined as the right button of the mouse. Therefore, clicking actions of the forefinger and the middle finger can correspondingly activate the function of single-clicking the left button of the mouse, the function of double-clicking the left button of the mouse and the function of single-clicking the right button of the mouse. Simultaneously clicking action of the forefinger and the middle finger can activate the function of single-clicking the middle button of the mouse, and back and forth moving the forefinger can activate the mouse wheel function. Simultaneously moving all of the fingers can correspondingly move the mouse cursor. However, it should be noted that though in the above embodiment the touch signal generated by touching the touch input unit via the right hand forefinger of the user is conformed to the first specific signal, and the touch signal generated by touching the touch input unit via the right hand middle finger is conformed to the second specific signal, so that the user can activate the aforementioned mouse functions via the actions of the forefinger and the middle finger, it is only one embodiment of the present invention. In other words, defining of the first specific signal and the second specific signal can be varied according to different utilization requirements (for example, a different habitual hand), so that the user can activate the mouse functions via habitual fingers.

Figure 3:
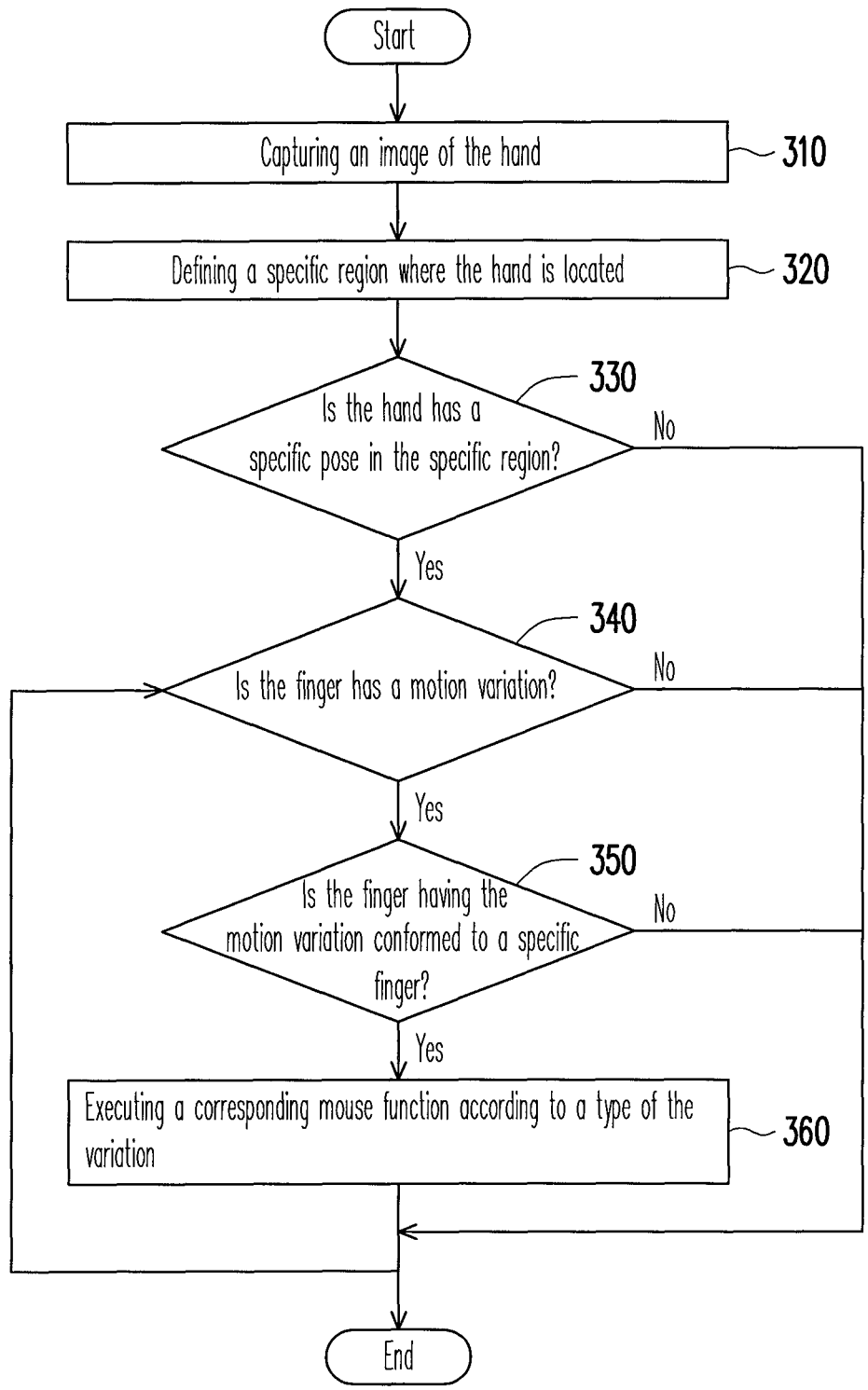
FIG. 3 is a flowchart illustrating a method for executing a mouse function of an electronic device according to another embodiment of the present invention.

In the following content, cases of applying different sensor modules 120 are described. In the following embodiment, the sensor module 120 of FIG. 1 is composed of an image capturing unit and a sensing unit. FIG. 3 is a flowchart of executing mouse functions based on an above structure. Referring to FIG. 1 and FIG. 3, in the present embodiment, the hand actions of the user are detected by the image capturing unit and the sensing unit, so as to execute the corresponding mouse function on the electronic device 100. First, in step 310, the image capturing unit (for example, a video camera) of the sensor module 120 captures an image of the user's hand. Since the sensor module 120 of the present embodiment includes the image capturing unit and the sensing unit, the input signal is a motion variation signal of the finger that is detected by the sensing unit.

Next, in step 320, the sensing unit of the sensor module 120 defines a specific region where the hand is located according to the image of the hand. Next, in step 330, the judging module 130 judges whether the hand has a specific pose in the specific region for generating the motion variation signal according to the motion variation signal detected by the sensing unit. In the present embodiment, the sensing unit is for example, an infrared projection device for projecting infrared ray to the user's hand to obtain a plurality of coordinates of a hand profile, so as to illustrate figures of the user's hand and fingers. Accordingly, such information can be provided to the judging module 130 for judging whether the hand is conformed to the specific pose. Wherein, the specific pose includes a vertical movement or a horizontal movement of the finger. Moreover, in the present embodiment, whether the hand profile within the image is conformed to the specific pose can be judged for activating the mouse function.

If the judging module 130 judges that the hand has the specific pose in the specific region, it is then determined that the user has put his hand at a predetermined position and is ready to start operating the electronic device 100. Next, in step 340, the judging module 130 judges whether there is a motion variation of any of the fingers. In the present embodiment, the coordinates of the hand profile obtained via the infrared projection can be used for representing current positions of the fingers, and the judging module 130 can judge whether the finger has the motion variation of vertical movement or horizontal movement, etc. by comparing the coordinates. In detail, each coordinate of the hand profile for example, has three vectors, and an average of the coordinates represents a current position of the whole hand. Once a vector representing a horizontal direction within the average of the coordinates is varied, it represents the user's hand has an action of the horizontal movement. When a vector representing a vertical direction within the average of the coordinates is varied, it represents the user's hand has an action of the vertical movement.

As long as one or more fingers have the motion variation, in step 350, the judging module 130 judges whether the finger having the motion variation is conformed to a specific finger according to a relative position of the fingers, and a motion variation signal corresponding to the specific finger is taken as the specific signal. In the present embodiment, if counting from a specific direction, the finger having the motion variation is an i-th finger of all of the fingers, such finger is then judged to be conformed to a first specific finger (i.e. the corresponding motion variation signal is conformed to the specific signal). If counting from the specific direction, the finger having the motion variation is a j-th finger of all of the fingers, such finger is then judged to be conformed to a second specific finger (i.e. the corresponding motion variation signal is conformed to the specific signal). Wherein, i and j are positive integers less than or equal to the predetermined value (i.e. 5), and i is not equal to j.

If the finger having the motion variation is conformed to the specific finger, in step 360, the judging module 130 executes the corresponding mouse function according to the type of the variation. It should be noted that in the present embodiment, as long as any of the fingers having the motion variation is not conformed to the defined specific finger, none mouse function can be activated. After the step 360, the step 340 is repeated, by which the judging module 130 continually judges whether any finger has the motion variation. If a certain finger has the motion variation, the follow-up steps are executed for correspondingly executing the mouse function according to the type of the variation when the finger having the motion variation is conformed to the specific finger. If the motion variation of any finger cannot be detected, the flowchart of the method for executing the mouse function of the electronic device is ended. In the following embodiment, types of the motion variation and corresponding relation of the mouse functions are described.

In an embodiment, if the finger having the motion variation is conformed to the first specific finger, the judging module 130 obtains an amount of vertical movements of the finger during the first time period. If the amount is 1, the function of single-clicking the left button of the mouse is executed, and if the amount is 2, the function of double-clicking the left button of the mouse is executed. Similarly, when the finger having the motion variation is conformed to the first specific finger, and if the judging module 130 judges that a time for the finger having the motion variation being horizontally moved reaches a second time period, the judging module obtains a motion track of the finger, and executes the mouse wheel function according to a direction of the motion track, wherein the second time period is greater than the first time period.

Moreover, when the finger having the motion variation is conformed to the second specific finger, the judging module 130 obtains an amount of vertical movements of the finger during the first time period. If the amount is 1, a function of single-clicking the right button of the mouse is executed. When the finger having the motion variation is the first specific finger and the second specific finger, the judging module 130 obtains an amount of vertical movements of the first specific finger and the second specific finger during the first time period. If the amount is 1, a function of single-clicking the middle button of the mouse is executed.

In another embodiment, after the judging module 130 judges that the hand profile is conformed to the specific pose, if all of the fingers are judged to be horizontally moved after the third time period, simultaneously, the judging module 130 obtains the motion track of the fingers, and correspondingly moves a position of the mouse cursor on the display 110 according to the motion track.

Assuming the judging module 130 judges that the second finger (counted from the left to the right) having the motion variation is conformed to the first specific finger, and judges that the third finger (counted from the left to the right) having the motion variation is conformed to the second specific finger, when the user put his hand at a predetermined position and poses a specific pose, the sensing unit can continually detects signals corresponding to the finger actions, so that the judging module 130 can judge whether any finger has the motion variation. Taking the right hand of the user as an example, clicking the forefinger of the right hand once can activate the function of single-clicking the left button of the mouse; and clicking the forefinger of the right hand twice can activate the function of double-clicking the left button of the mouse. If the user slides back and forth the forefinger of the right hand, the mouse wheel function is activated. Clicking the middle finger of the right hand once can activate the function of single-clicking the right button of the mouse, and if the user simultaneously single-clicks the forefinger and the middle finger of the right hand, the function of single-clicking the middle button of the mouse is then activated. Moreover, if the user simultaneously moves 5 fingers on a plane, the mouse cursor is then correspondingly moved.

In the above embodiment, the image capturing unit of the sensor module 120 is used for capturing the image of the hand, and the motion variation signals of the fingers are provided by the sensing unit (for example, the infrared projection device), so that the judging module 130 can identify the finger having the motion variation and the type of the motion variation, and correspondingly execute different mouse functions on the electronic device 100. It should be again noted that definition of the first specific finger and the second specific finger is only an embodiment which is not used for limiting the present invention.

In summary, according to the method for executing the mouse functions of the electronic device and the electronic device thereof, actions of the user's hand are obtained via the sensor module, and the judging module correspondingly execute the mouse functions on the electronic device according to the finger having the motion variation and the type of the motion variation. The present invention can provide a virtual mouse operating platform, so that not only a mouse utilization habit of the user can be inherited, but also inconvenience of carrying an additional mouse can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for executing a mouse function of an electronic device, the electronic device comprising a sensor module, and the method comprising:

detecting an amount of a plurality of input signals and a relative position of the input signals via the sensor module, wherein the sensor module is a touch input unit, and the input signal is a touch signal;

judging whether the amount and the relative position are respectively conformed to a predetermined value;

after the amount is judged to be conformed to the predetermined value, obtaining a motion track of the touch signal if a time for the touch input unit continually detecting the touch signals exceeds a third time period, and when the touch signals are simultaneously varied;

correspondingly moving a mouse cursor according to the motion track;

if the predetermined values are conformed, and when a variation of the relative position of the input signals is occurred, judging whether the variation is conformed to a specific signal, the step comprising:

judging the varied touch signal is conformed to a first specific signal if counting from a specific direction, the varied touch signal is an i-th touch signal of the touch signals; and judging the varied touch signal is conformed to a second specific signal if counting from the specific direction, the varied touch signal is a j-th touch signal of the touch signals, wherein i and j are positive integers less than or equal to the predetermined value, and i is not equal to j; and if the variation is conformed to the specific signal, executing a corresponding mouse function according to a type of the variation.

2. The method for executing a mouse function of an electronic device as claimed in claim 1, wherein the variation represents that the touch signal is disappeared or a position thereof is shifted.

3. The method for executing a mouse function of an electronic device as claimed in claim 1, wherein if the variation is conformed to the specific signal, the step of executing the corresponding mouse function according to the type of the variation comprises:
  obtaining an amount of the touch signal detected by the touch input unit during a first time period when the varied touch signal is conformed to the first specific signal;
  executing a function of single-clicking a left button of a mouse if the amount is 1; and
  executing a function of double-clicking the left button of the mouse if the amount is 2.

4. The method for executing a mouse function of an electronic device as claimed in claim 3, wherein if the variation is conformed to the specific signal, the step of executing the corresponding mouse function according to the type of the variation comprises:
  obtaining a motion track of the touch signal if a time for the touch input unit continually detecting the touch signal exceeds a second time period, and when the varied touch signal is conformed to the first specific signal, wherein the second time period is greater than the first time period; and
  executing a mouse wheel function according to a direction of the motion track.

5. The method for executing a mouse function of an electronic device as claimed in claim 1, wherein if the variation is conformed to the specific signal, the step of executing the corresponding mouse function according to the type of the variation comprises:
  obtaining an amount of the touch signal detected by the touch input unit during the first time period when the varied touch signal is conformed to the second specific signal; and
  executing a function of single-clicking a right button of the mouse if the amount is 1.

6. The method for executing a mouse function of an electronic device as claimed in claim 1, wherein if the variation is conformed to the specific signal, the step of executing the corresponding mouse function according to the type of the variation comprises:
  obtaining an amount of the varied touch signal detected by the touch input unit during the first time period when the varied touch signal is simultaneously conformed to the first specific signal and the second specific signal; and
  executing a function of single-clicking a middle button of the mouse if the amount is 1.

7. The method for executing a mouse function of an electronic device as claimed in claim 1, wherein the touch input unit comprises a touch pad or a touch screen.

8. An electronic device having a mouse executing function, suitable for executing a plurality of mouse functions according to motion variations of a hand, the electronic device comprising:
  a display, having a screen capable of displaying a mouse cursor;
  a sensor module, coupled to the display for detecting an amount of a plurality of input signals and a relative position of the input signals, wherein the sensor module is a touch input unit, and the input signal is a touch signal; and
  a judging module, simultaneously coupled to the display and the sensor module for judging whether the amount and the relative position are respectively conformed to a predetermined value,
  wherein when the judging module judges the touch signals are simultaneously varied, and if a time for the touch input unit continually detecting the touch signals exceeds a third time period, the judging module obtains a motion track of the touch signal, and correspondingly moves a mouse cursor according to the motion track,
  wherein if the predetermined values are conformed, and when the relative position of the input signals is varied, whether the variation is conformed to a specific signal is determined,
  wherein the judging module judges that the varied touch signal is conformed to a first specific signal if counting from a specific direction, the varied touch signal is an i-th touch signal of the touch signals; and judges the varied touch signal is conformed to a second specific signal if counting from the specific direction, the varied touch signal is a j-th touch signal of the touch signals, wherein i and j are positive integers less than or equal to the predetermined value, and i is not equal to j,
  and a corresponding mouse function is executed according to a type of the variation if the variation is conformed to the specific signal.

9. The electronic device as claimed in claim 8, wherein the variation represents that the touch signal is disappeared or a position thereof is shifted.

10. The electronic device as claimed in claim 8, wherein the judging module obtains an amount of the touch signal detected by the touch input unit during a first time period when the varied touch signal is conformed to the first specific signal, and executes a function of single-clicking a left button of a mouse if the amount is 1, or executes a function of double-clicking the left button of the mouse and if the amount is 2.

11. The electronic device as claimed in claim 10, wherein when the varied touch signal is conformed to the first specific signal, and if a time for the touch input unit continually detecting the touch signal exceeds a second time period, the judging module obtains a motion track of the touch signal, and executes a mouse wheel function according to a direction of the motion track, wherein the second time period is greater than the first time period.

12. The electronic device as claimed in claim 8, wherein the judging module obtains an amount of the touch signal detected by the touch input unit during the first time period when the varied touch signal is conformed to the second specific signal, and executes a function of single-clicking a right button of the mouse if the amount is 1.

13. The electronic device as claimed in claim 8, wherein the judging module obtains an amount of the varied touch signal detected by the touch input unit during the first time period when the varied touch signal is simultaneously conformed to the first specific signal and the second specific signal, and executes a function of single-clicking a middle button of the mouse if the amount is 1.

14. The electronic device as claimed in claim 8, wherein the touch input unit comprises a touch pad or a touch screen.

* * * * *